(12) United States Patent
Yutaka et al.

(10) Patent No.: US 11,733,705 B2
(45) Date of Patent: Aug. 22, 2023

(54) MOVING BODY AND MOVING BODY CONTROL METHOD

(71) Applicant: Sony Interactive Entertainment Inc., Tokyo (JP)

(72) Inventors: Teiji Yutaka, Kanagawa (JP); Takeshi Yamagishi, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 362 days.

(21) Appl. No.: 16/958,947

(22) PCT Filed: Jan. 16, 2018

(86) PCT No.: PCT/JP2018/000937
§ 371 (c)(1),
(2) Date: Jun. 29, 2020

(87) PCT Pub. No.: WO2019/142227
PCT Pub. Date: Jul. 25, 2019

(65) Prior Publication Data
US 2020/0341481 A1    Oct. 29, 2020

(51) Int. Cl.
*G05D 1/02*    (2020.01)
(52) U.S. Cl.
CPC .................................. *G05D 1/0227* (2013.01)
(58) Field of Classification Search
None
See application file for complete search history.

(56) References Cited

U.S. PATENT DOCUMENTS

| | | | |
|---|---|---|---|
| 6,458,008 B1 * | 10/2002 | Hyneman | A63H 1/00 446/259 |
| 7,657,345 B2 | 2/2010 | Endo | |
| 7,814,037 B2 | 10/2010 | Ito | |
| 8,135,740 B2 | 3/2012 | Friedlander et al. | |
| 8,571,714 B2 | 10/2013 | Gienger | |
| 9,375,645 B2 | 6/2016 | Mizuki | |
| 9,690,373 B2 | 6/2017 | Haseltine | |
| 10,064,684 B2 | 9/2018 | Nakamura | |
| 10,510,189 B2 | 12/2019 | Numaguchi | |

(Continued)

FOREIGN PATENT DOCUMENTS

| | | | |
|---|---|---|---|
| JP | 10268936 A | 10/1998 | |
| JP | 2000218578 A | 8/2000 | |

(Continued)

OTHER PUBLICATIONS

Watchmeplaynintendo, Wii Sports—Golf, YouTube video https://www.youtube.com/watch?v=-Mm7xoaTzdM (Year: 2016).*

(Continued)

*Primary Examiner* — Jaime Figueroa
*Assistant Examiner* — Arslan Azhar
(74) *Attorney, Agent, or Firm* — Matthew B. Dernier, Esq.

(57) ABSTRACT

A control unit drives a drive source to move the moving body. A detection unit detects external force applied to the moving body. A movement information deriving unit derives, based on the detected external force, a movement direction and movement speed of the moving body. The control unit drives the drive source based on the movement direction and movement speed derived by the movement information deriving unit.

9 Claims, 9 Drawing Sheets

(56) References Cited

U.S. PATENT DOCUMENTS

| | | | |
|---|---|---|---|
| 10,546,408 B2 | 1/2020 | Yang | |
| 2002/0098890 A1 | 7/2002 | Sakaguchi | |
| 2005/0113973 A1 | 5/2005 | Endo | |
| 2007/0239641 A1 | 10/2007 | Ito | |
| 2008/0039250 A1* | 2/2008 | Martino | A63B 43/00 473/613 |
| 2008/0312772 A1 | 12/2008 | Hasegawa | |
| 2010/0057255 A1 | 3/2010 | Ra | |
| 2010/0222924 A1 | 9/2010 | Gienger | |
| 2011/0118019 A1 | 5/2011 | Kondo | |
| 2012/0009845 A1* | 1/2012 | Schmelzer | A63H 17/00 446/431 |
| 2012/0173050 A1* | 7/2012 | Bernstein | G05D 1/0278 701/2 |
| 2014/0343369 A1 | 11/2014 | Nakamura | |
| 2014/0379802 A1 | 12/2014 | Mizuki | |
| 2015/0209664 A1 | 7/2015 | Haseltine | |
| 2015/0286216 A1 | 10/2015 | Miwa | |
| 2016/0151909 A1 | 6/2016 | Hardouin | |
| 2017/0024934 A1 | 1/2017 | Numaguchi | |
| 2019/0147658 A1 | 5/2019 | Kurabayashi | |
| 2020/0282555 A1 | 9/2020 | Jia | |
| 2020/0364625 A1 | 11/2020 | Baker | |
| 2021/0197381 A1 | 7/2021 | Bordegnoni | |

FOREIGN PATENT DOCUMENTS

| | | | |
|---|---|---|---|
| JP | 2000326274 A | 11/2000 | |
| JP | 2002210235 A | 7/2002 | |
| JP | 2002337079 A | 11/2002 | |
| JP | 2005096068 A | 4/2005 | |
| JP | 2006293442 A | 10/2006 | |
| JP | 2007175286 A | 7/2007 | |
| JP | 2007323675 A | 12/2007 | |
| JP | 2008137143 A | 6/2008 | |
| JP | 2008307640 A | 12/2008 | |
| JP | 2010022494 A | 2/2010 | |
| JP | 2014204794 A | 10/2014 | |
| JP | 2015007821 A | 1/2015 | |
| JP | 2015533534 A | 11/2015 | |
| JP | 2016502694 A | 1/2016 | |
| JP | 201765467 A | 4/2017 | |
| JP | 2017227975 A | 12/2017 | |
| JP | 2010058260 A | 3/2020 | |
| JP | 2010201611 A | 9/2020 | |
| WO | 2014035640 A1 | 3/2014 | |
| WO | 2014068982 A1 | 5/2014 | |
| WO | 2015159561 A1 | 10/2015 | |

OTHER PUBLICATIONS

Gadgets and Gears, How To Play Wii Tennis, YouTube video https://www.youtube.com/watch?v=06d28Mf6KTs (Year: 2011).*

Gennaro Raiola, Co-manipulation with a library of virtual guiding fixtures, Nov. 23, 2017. Springer Science+Business Media, LLC (Year: 2017).*

International Search Report for related PCT Application No. PCT/JP2018/000938, 4 pages, dated Mar. 6, 2018.

International Search Report for related PCT Application No. PCT/JP2018/000939, 4 pages, dated Apr. 24, 2018.

Notice of Reasons for Refusal for related JP Application No. 2021-152223, 7 pages, dated Jul. 8, 2022.

Notice of Reasons for Refusal for corresponding JP Application No. 2019-566008, 8 pages, dated Jan. 28, 2022.

Decision to Grant for corresponding JP Application No. 2019-566006, 2 pages, dated Sep. 13, 2021.

International Search Report for related PCT Application No. PCT/JP2018/000937, 11 pages, dated Jul. 30, 2020.

International Search Report for related PCT Application No. PCT/JP2018/000938, 13 pages, dated Jul. 30, 2020.

International Search Report for related PCT Application No. PCT/JP2018/000939, 13 pages, dated Jul. 30, 2020.

International Search Report for corresponding PCT Application No. PCT/JP2018/000937, 4 pages, dated Mar. 27, 2018.

Notice of Reasons for Refusal for corresponding JP Application No. 2019-566007, 5 pages, Mar. 9, 2021.

Notice of Reasons for Refusal for related JP Application No. 2019-566008, 5 pages, Jul. 5, 2021.

Marcia Riley, et al., "Coaching: An Approach to Efficiently and Intuitively Create Humanoid Robot Behaviors," 2006 6th IEEE-RAS International Conference on Humanoid Robots, pp. 567-574, Jan. 1, 2006.

* cited by examiner

MOVING BODY AND MOVING BODY CONTROL METHOD

TECHNICAL FIELD

The present invention relates to a technology that is used in robotic systems.

BACKGROUND ART

Hitherto, various types of robots have been studied and developed. PTL 1 discloses various learning methods for the walk control of a humanoid two-legged mobile robot. In PTL 1, as one of the learning methods, there is discussed a stable walk trajectory learning method that allows, in a case where a robot cannot walk stably on an initially given walk trajectory, the robot to walk using the framework of reinforcement learning. PTL 2 discloses a spherical robot including a highly safe moving mechanism.

CITATION LIST

Patent Literature

[PTL 1] Japanese Patent Laid-open No. 2005-96068 [PTL 2] Japanese Patent Laid-open No. 2000-218578

SUMMARY

Technical Problem

Technological advances have brought the day-to-day evolution of robotic functions. As commercially available robot models, pet robots that are quadrupedal walking robots have hitherto been popular. In recent years, however, humanoid robots capable of performing various types of operation such as dancing have been distributed. Further, the enhancement of the processing performance of computers and the improvement of learning models have put deep learning to practical use. It is therefore expected that robots having mounted thereon AI (artificial intelligence) become capable of enhancing existing functions and acquiring new functions by learning themselves. The inventors of the present invention have paid attention to such evolution of the robotics and peripheral technologies, to thereby arrive at a technology that is an element for realizing entertainment using robots.

It is an object of the present invention to provide a technology for making an entertainment system using robots more entertaining.

Solution to Problem

In order to achieve the above-mentioned challenge, according to an aspect of the present invention, there is provided a moving body including a control unit configured to drive a drive source, thereby moving the moving body, a detection unit configured to detect external force applied to the moving body, and a movement information deriving unit configured to derive, based on the detected external force, a movement direction and movement speed of the moving body. The control unit drives the drive source based on the movement direction and movement speed derived by the movement information deriving unit.

Another aspect of the present invention is a control method for a moving body. The method includes the steps of detecting external force applied to the moving body, deriving, based on the detected external force, a movement direction and movement speed of the moving body, and driving a drive source based on the derived movement direction and movement speed to move the moving body.

Note that, any combination of the foregoing components and any conversion of the expressions of the present invention from/to methods, devices, systems, computer programs, recording media having recorded thereon computer programs in a readable manner, data structures, and the like are also effective as aspects of the present invention.

DESCRIPTION OF EMBODIMENT

Figure 1:
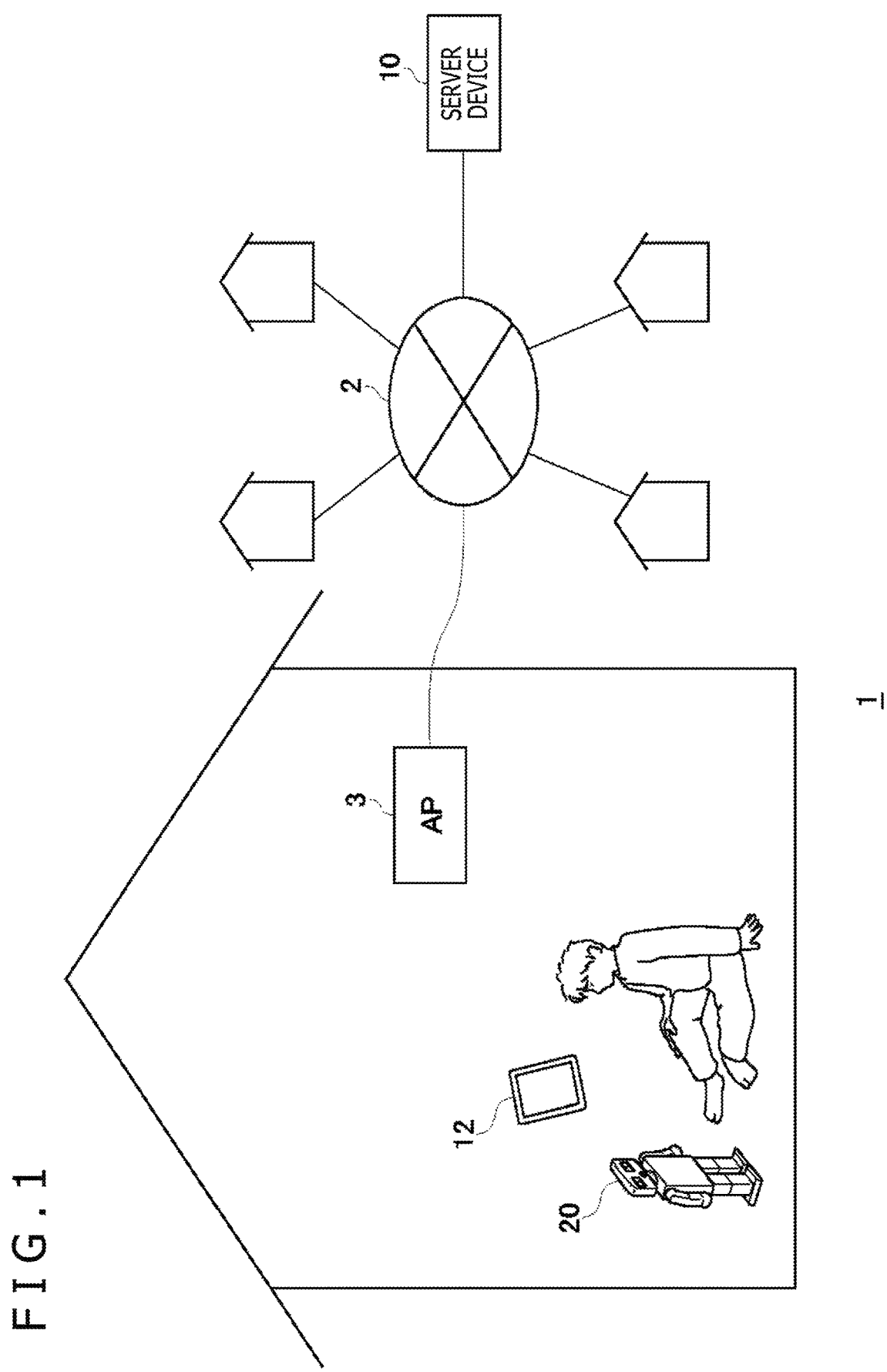
FIG. 1 is a diagram illustrating a schematic configuration of an entertainment system according to an embodiment.

FIG. 1 illustrates a schematic configuration of an entertainment system 1 according to an embodiment. The entertainment system 1 includes a robotic device 20, a server device 10 configured to build virtual worlds in which the robotic device 20 joins, and a terminal device 12 configured to display, on a display, virtual worlds in which the robotic device 20 joins. The server device 10, the terminal device 12, and the robotic device 20 may each be configured as an information processing device. The robotic device 20 and the terminal device 12 are connected to the server device 10 in a communicable manner with an access point (AP) 3 via a network 2 such as the internet.

The robotic device 20 is configured as a humanoid robot, for example, and owned by a user. The robotic device 20 can preferably recognize the user, namely, the owner by facial recognition based on image analysis or voice recognition based on voice analysis, for example. The robotic device 20 recognizes the owner, thereby being capable of acting to receive instructions only from the owner and reject instructions from strangers, for example. The robotic device 20 has similar parts to a human and includes, in each connection portion between the parts, a joint portion having an actuator mounted thereon. The robotic device 20 drives the actuators to execute various functions while keeping the postural balance.

With regard to basic functions such as walk and run, the robotic device 20 has installed thereon program modules each having a description on a control method for each actuator, that is, control modes. Further, the robotic device 20 can acquire a new function by downloading and installing a program module for executing the new function from an external device such as the server device 10.

The robotic device 20 according to the embodiment learns, thereby being capable of improving existing functions including the basic functions and acquiring new functions that the robotic device 20 has not been able to perform. For example, a control mode of each of the actuators of the joint portions for the basic function of "running," is installed in advance. When receiving coaching on a tips for "running fast" from the user, the robotic device 20 learns by following the coaching details to acquire a function of "running faster" than the basic function. At this time, the robotic device 20 improves the control mode for executing the basic function of "running" to derive a control mode for realizing the function of "running fast," to thereby acquire the function of "running fast." Note that, when the robotic device 20 cannot acquire the function of "running fast" by improving the control mode of the basic function, the robotic device 20 may ignore the control mode of the basic function, specifically, may acquire the control mode for "running fast" by learning the control mode from the beginning without using the program module of the function of "running."

FIG. 1 illustrates only one robotic device 20. In the embodiment, however, it is assumed that the plurality of robotic devices 20 having the same specification join in the entertainment system 1. For example, in a case where the robotic device 20 of the user can run 1 meter (m) in approximately two seconds with the preset function of "running," the other robotic devices 20 having the same specification are also configured to run 1 m in approximately two seconds.

In the entertainment system 1, a user who wants his/her own robotic device 20 to run faster teaches the robotic device 20 how to run faster (a tip to run faster). In the embodiment, teaching by the user to improve the basic functions or make the robotic device 20 learn new functions is called "coaching." The robotic device 20 has various operation modes. When entering a "coaching mode," the robotic device 20 receives coaching by the user. When entering a "learning mode," the robotic device 20 performs machine learning by following the details of received coaching.

For example, in a case where the user gives the robotic device 20 a mission (task) to "become capable of running faster than now," when the robotic device 20 becomes capable of running 1 m in less than two seconds, the mission is accomplished. The robotic device 20 records a control mode of each actuator with which the robotic device 20 has been able to run 1 m in less than two seconds. The robotic device 20 may then end learning.

However, in a case where the user gives the robotic device 20 a mission to "become capable of running 1 m in 1.5 seconds or less," even with appropriate coaching by the user, the mission cannot always be accomplished since the difficulty level of the mission is high. Note that, in a case where coaching by the user is inappropriate, the robotic device 20 becomes slower at running on the contrary as a result of machine learning that reflects the coaching details. In this way, the robotic device 20 tries to accomplish a given mission through trials and errors. However, for example, in a case where the robotic device 20 has failed to accomplish a mission with the maximum number of trials, the robotic device 20 preferably notifies the user of the failure. By being notified, the user gets an opportunity to change the coaching details.

When having successfully improved the performance of the basic function of the robotic device 20, the user wants to match his/her own robotic device 20 against the robotic devices 20 of other users. For example, a person in charge of the entertainment system 1 rents a space such as a gymnasium and hosts a robot race "5-meter dash" such that the user can bring the robotic device 20 in the venue to enter the 5-meter dash race with the robotic device 20. The plurality of robotic devices 20 are lined up on the starting line, and start all at once toward the goal, which is 5 m ahead, with a starting signal. A starting signal may be a phrase "on your mark, get set, go." For example, the robotic device 20 may start to run when the user manually or wirelessly operates the start switch of the robotic device 20. At this time, the robotic device 20 that has got the optimum improvement of the function of "running" crosses the finishing line first among the robots, and a user who owns the robotic device 20 in question wins laurels.

Such a race is a great opportunity to see learning outcomes, and increases the coaching motivation of the user since there are winners and losers. However, it is difficult for users living far from the venue to bring the robotic devices 20 to the venue, and it is hard to say that such users can easily participate in the race.

Accordingly, in the entertainment system 1, the server device 10 provides a virtual stadium in which a competition between the plurality of robotic devices 20 is held. In this virtual stadium, each user and each robotic device 20 can participate in an athletic event without leaving home. An example of the virtual stadium is a venue in which a robot race "5-meter dash" is held. The server device 10 prepares a three-dimensional stadium in which the starting line, the finishing line which is 5 m ahead from the starting line, and the running lanes for the respective robots that are drawn on the ground, and lines up the CG (computer graphics) models of the respective participating robotic devices 20 on the starting line. The CG model of the robotic device 20 is hereinafter sometimes referred to as a "virtual robot." Image data indicating what is happening in the stadium is distributed from the server device 10 to the terminal device 12. The user can see his/her own robotic device 20 being on the starting line through the display of the terminal device 12.

Each user secures a space large enough for the robotic device 20 to run 5 m in the house, and waits a starting signal to be provided from the server device 10. Note that, the robotic device 20 runs with the effect of the ground surface (floor surface). Thus, to be fair, there may be made a rule that each user buys a 5 m race mat and the robotic device 20 runs on the mat.

When hearing a starting signal from the terminal device 12, namely, a phrase "on your mark, get set, go" in this example, the user operates the start switch of the robotic device 20 manually or with a remote controller, to thereby make the robotic device 20 start to run. The remote controller function may be realized by the terminal device 12. Note that, in accordance with a program, a starting signal may be directly supplied from the server device 10 to the robotic device 20, and the robotic device 20 may automatically start to run when receiving the signal from the server device 10.

Operation data indicating each running robotic device 20 is transmitted from the robotic device 20 or the terminal device 12 to the server device 10 in real time. Operation data indicating a running robotic device may include, for example, detection data obtained by an accelerometer or a gyro sensor, or an image taken by the camera of the robotic device 20. In any case, operation data is preferably data that enables the identification of a cumulative distance that the robotic device 20 has run from the start. Further, operation data may include actuator drive data that allows the virtual robot to reproduce the posture of the robotic device 20.

The server device 10 reflects the operation data regarding the robotic device 20 in a running manner of the corresponding virtual robot, to thereby simulate the competition between the plurality of virtual robots. The server device 10 makes the virtual robot run in the virtual stadium at a speed corresponding to a speed at which the robotic device 20 is running in the real world. Thus, the virtual robot of the robotic device 20 that runs 5 m at the shortest time in the real world reaches the finishing line first in the virtual stadium. Each user can watch the performance of the virtual robot corresponding to his/her own robotic device 20 in a competition video distributed from the server device 10 to the terminal device 12.

As described above, the entertainment system 1 provides an environment in which the user coaches the robotic device 20 and the robotic device 20 trains by following the coaching details, and also provides an environment in which the robotic device 20 can demonstrate the results of its training. In the following, coaching by the user is first described.

Figure 2:
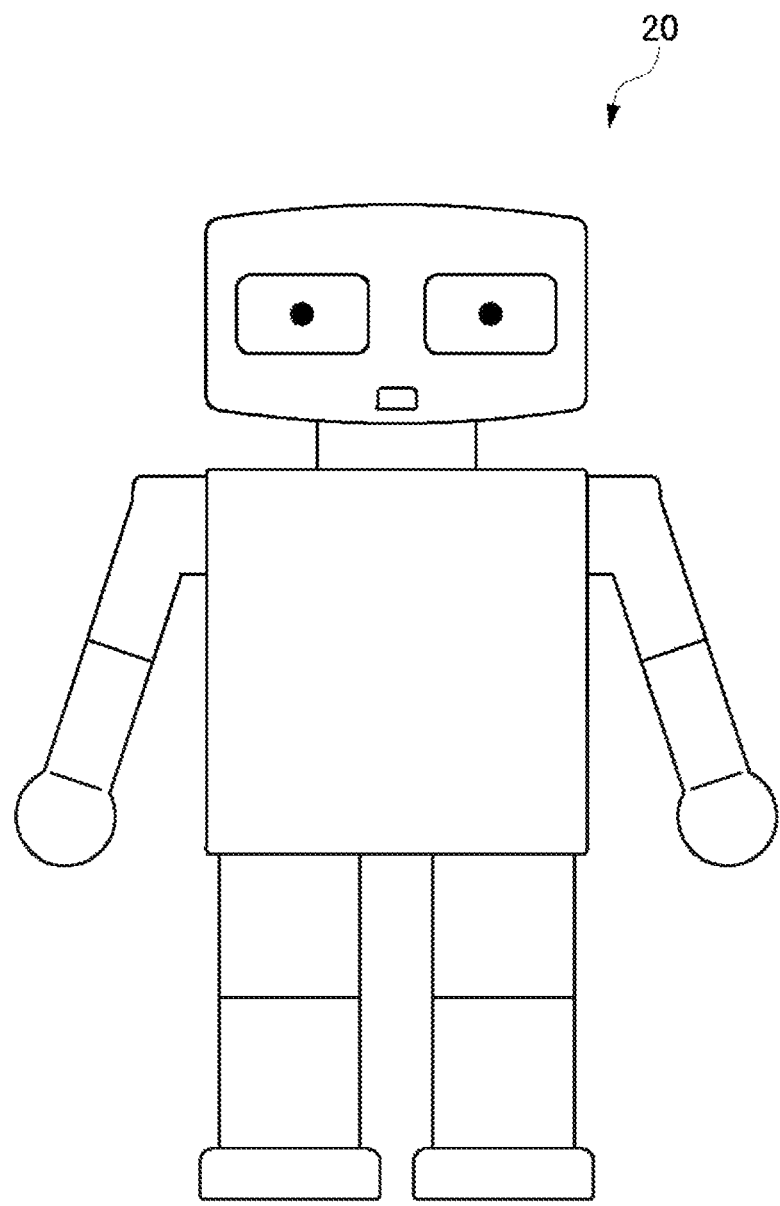
FIG. 2 is a diagram illustrating an example of an appearance of a robotic device.

FIG. 2 illustrates an example of an appearance of the robotic device 20, which is a humanoid robot. Similarly to a human, the robotic device 20 has a head, a neck, a trunk (chest, abdomen, and back), upper limbs, and lower limbs. The upper limbs include upper arms, forearms, and hands. The lower limbs include thighs, lower legs, and feet. In each connection portion between the parts, a joint portion having an actuator mounted thereon is provided.

Figure 3:
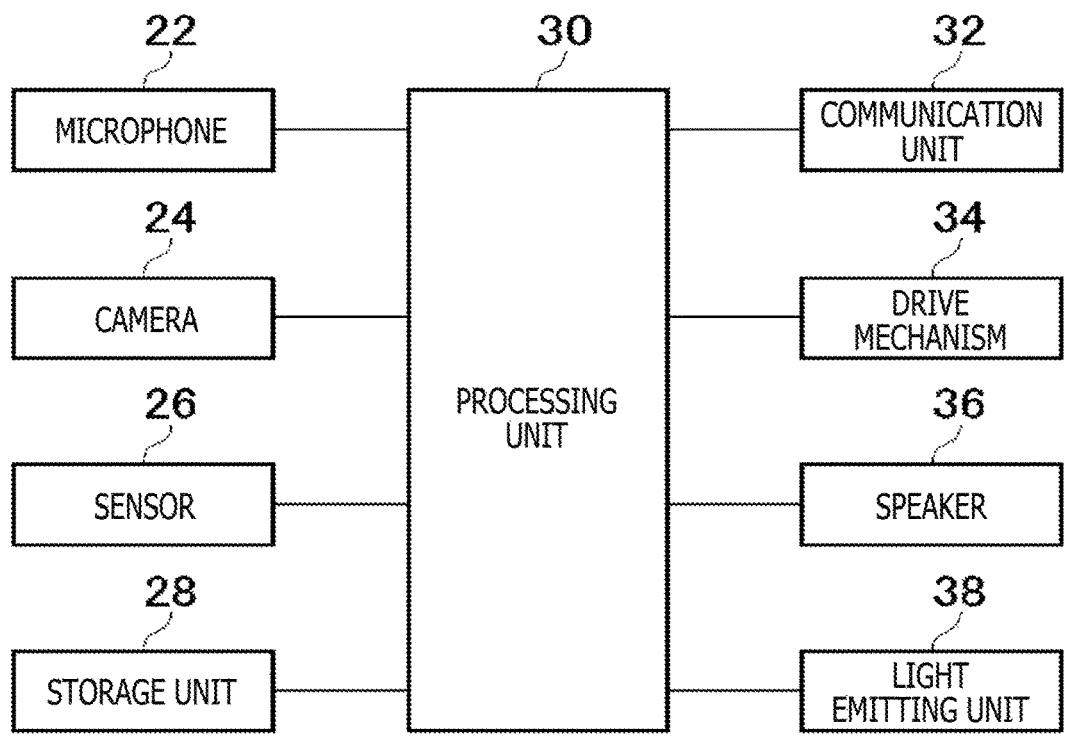
FIG. 3 is a diagram illustrating an input/output system of the robotic device.

FIG. 3 illustrates an input/output system of the robotic device 20. A processing unit 30 is a main processor configured to process and output various kinds of data such as voice data, image data, or sensor data, or orders. The processing unit 30 controls a drive mechanism 34 to move the robotic device 20. Further, the processing unit 30 controls a speaker 36 to output voice and controls a light emitting unit 38 to emit light. The drive mechanism 34 includes motors incorporated in the joint portions, which are the movable parts of the robotic device 20, link mechanisms for coupling the motors to each other, and rotation-angle sensors configured to detect the rotation angles of the motors. With the motor being driven, the joint portion of, for example, the arm, the leg, or the neck, of the robotic device 20 moves.

A microphone 22 collects surrounding voice and converts the surrounding voice to voice signals. A camera 24 shoots the surroundings to acquire taken images. A sensor 26 includes a touch sensor configured to detect contacts with the user, a three-axis accelerometer, a gyro sensor, a position detecting sensor, or the like. A storage unit 28 stores, for example, data or orders that the processing unit 30 processes. In particular, in the embodiment, the processing unit 30 accumulates control modes obtained by learning in the storage unit 28. Through an antenna, a communication unit 32 transmits data output from the processing unit 30 to the server device 10 by wireless communication, or receives various kinds of data or information from the server device 10 by wireless communication and outputs the data or information to the processing unit 30. For example, the processing unit 30 may download and install a program module for executing a new operation function through the communication unit 32.

Figure 4:
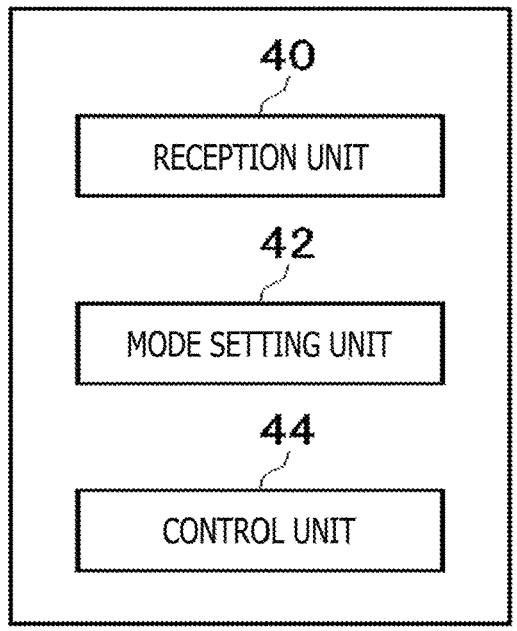
FIG. 4 is a diagram illustrating functional blocks of a processing unit.
Figure 5:
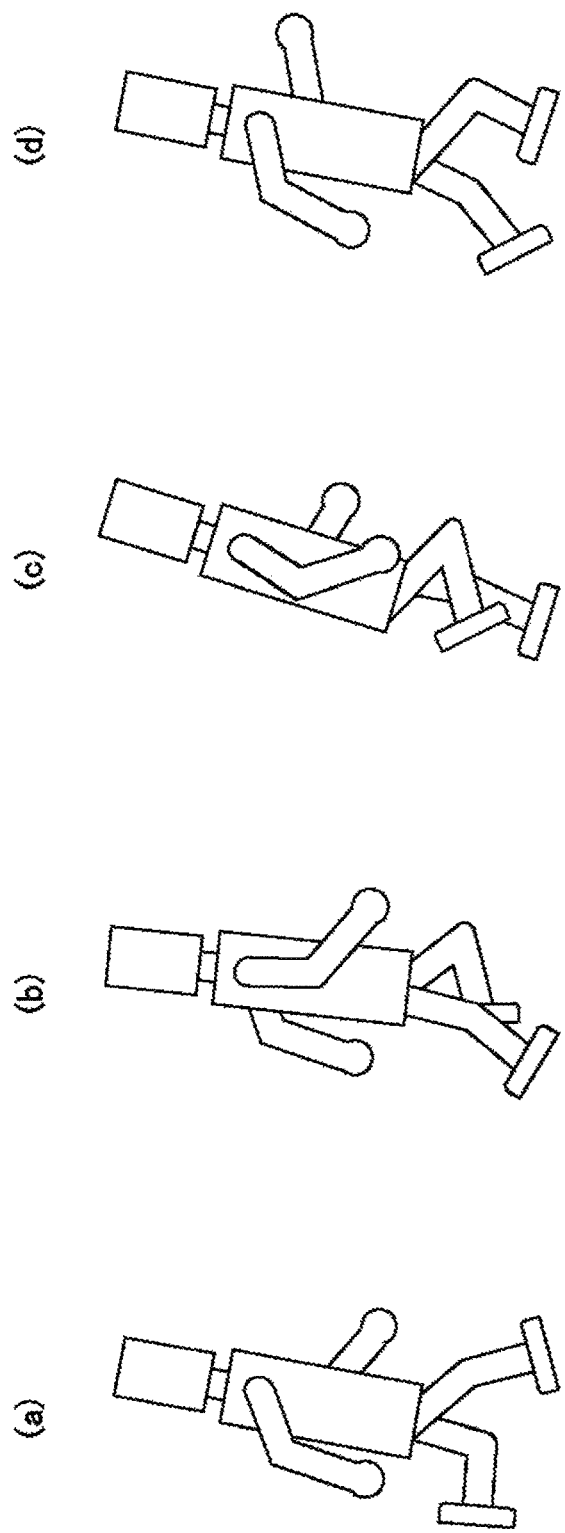
FIG. 5 depicts diagrams illustrating examples of running postures of the robotic device.

FIG. 4 illustrates functional blocks of the processing unit 30. The processing unit 30 includes a reception unit 40, a mode setting unit 42, and a control unit 44. The reception unit 40 receives instructions from the user or notifications from the server device 10. In FIG. 4, the elements illustrated as the functional blocks that perform various types of processing can each be configured as a circuit block, a memory, or another LSI (large scale integration) in terms of hardware, and can each be configured as a program loaded on a memory in terms of software, for example. It will thus be understood by those skilled in the art that the functional blocks can be configured by hardware only, software only, or a combination thereof in diverse forms and are not limited to any one of such forms.

The robotic device 20 operates in an operation mode selected from the group of a plurality of operation modes. The operation modes include at least an autonomous action mode in which the robotic device 20 autonomously acts, a coaching mode in which the robotic device 20 receives coaching from the user, a learning mode in which the robotic device 20 autonomously learns, and a designated action mode in which the robotic device 20 acts by following instructions from the user.

When the reception unit 40 receives a mode selection instruction from the user or the server device 10, the mode setting unit 42 sets any one of the operation modes in the operation mode group. Note that, even in a case where the reception unit 40 receives another kind of instruction instead of a mode selection instruction, the mode setting unit 42 may automatically set an operation mode depending on the instruction. The mode setting unit 42 preferably controls the light emitting unit 38 to emit light with an emission color depending on the set operation mode. The user can check a current operation mode by checking an emission color.

The reception unit 40 may receive a mode selection instruction from the user through a robot operation remote controller, or receive a mode selection instruction by voice analysis of the user's voice. Further, the reception unit 40 may receive a mode selection instruction when the touch sensor detects a predetermined contact. In the following, there is described a case where the reception unit 40 receives an instruction to select the "coaching mode," and the mode setting unit 42 sets the coaching mode as the operation mode.

In the embodiment, missions are given to the robotic device 20. Missions, which can also be called "task" or "challenge," are what the robotic device 20 learns. The user may give the robotic device 20 a mission of acquiring a function that the robotic device 20 has not been able to execute. In the following, a case where a mission to "become capable of running faster than now" is given to the robotic device 20 is described. Note that, the server device 10 may give a predetermined mission to all the robotic devices 20 that are connected to the entertainment system 1, and a race in which the robotic devices 20 compete on the learning outcome may take place at a later date.

The storage unit 28 has stored therein the control mode of the function of "running" mounted as a preset default function. A control mode indicates a procedure including the drive timings of the drive mechanism 34 in chronological order. When the control unit 44 drives the drive mechanism 34 on the basis of a control mode, the robotic device 20 starts to run.

FIGS. 5(a) to (d) illustrate examples of running postures of the robotic device 20. When the control unit 44 controls the robotic device 20 to run on the basis of a control mode, the robotic device 20 performs the running action while sequentially changing its posture in the order of the posture illustrated in FIG. 5(a), the posture illustrated in FIG. 5(b), the posture illustrated in FIG. 5(c), and the posture illustrated in FIG. 5(d). The robotic device 20 runs 1 m in two seconds, that is, the robotic device 20 has, as a default function, a basic function of running 0.5 m per second.

To coach the robotic device 20 on how to run fast, the user gives posture instructions to the robotic device 20. As what is important for a human to run fast, there have been known posture-related tips, for example, keeping a sharply leaning forward posture, not moving the head, and bringing the thighs as high as possible. The user gives the robotic device 20, which is a humanoid robot, instructions on postures that enable the robotic device 20 to run fast. The control unit 44 receives the posture instructions from the user and controls the storage unit 28 to store the instructions in the coaching mode.

In this example, the user provides, to the robotic device 20, instructions on a plurality of postures that the user considers enable the robot to run fast. A posture instruction may identify a posture to be taken. FIGS. 5(a) to (d) illustrate the four postures. The user may change the four postures to respective postures that enable the robotic device 20 to run fast, and provide information identifying the changed postures to the robotic device 20. When the user considers that the robotic device 20 leaning forward more can run faster with the default function, the user inputs, to the robotic device 20, instructions to change the four postures to slightly more leaning forward postures. The control unit 44 receives the instructions on the plurality of postures input from the user and controls the storage unit 28 to store the instructions. Note that, as a matter of course, the user may input pieces of information identifying five or more postures that enable the robotic device 20 to run fast to the robotic device 20 in chronological order, and the control unit 44 may control the storage unit 28 to store the information.

After inputting the posture instructions in the coaching mode, the user inputs, to the robotic device 20, a mode selection instruction to switch the operation mode of the robotic device 20 to the "learning mode." When the reception unit 40 receives the mode selection instruction for switching to the "learning mode," the mode setting unit 42 sets the learning mode as the operation mode.

In the learning mode, while reflecting, in the posture of the robotic device 20, the posture instructions that the reception unit 40 has received in the coaching mode, the control unit 44 derives a control mode of the drive mechanism 34 for accomplishing the mission to "become capable of running faster than now" by learning. Any kind of learning algorithms may be applied alone or in combination depending on the given mission. Specifically, supervised learning, unsupervised learning, reinforcement learning, or the like may be applied.

In the above-mentioned example, in the coaching mode, the robotic device 20 receives, as posture instructions for accomplishing the mission, the instructions to change the four postures illustrated in FIGS. 5(a) to (d) to the slightly more leaning forward postures. In the embodiment, the user does not input all postures in the sequence of running actions, but inputs only some postures in key frames taken out of the sequence of running actions. Thus, reinforcement learning by the control unit 44 for interpolation of at least postures between the key frames is necessary.

Note that, since the control mode of the "running" action is incorporated at this time as a default function, the control unit 44 may use the default control mode as reference information. Further, information regarding a posture that enables the robotic device 20 to run fast may be acquired from the external server device 10 or the like. The control unit 44 preferably uses the reference information to efficiently derive the control modes while reflecting the posture instructions, which have been given by the user, in the posture of the robotic device 20.

With an instruction input method by the user, the user moves the joint portions of the robotic device 20 with the hands such that the robotic device 20 takes a posture that the user considers enables the robotic device 20 to run fast, to thereby make the robotic device 20 learn the posture. To be specific, in the coaching mode, when the user changes the posture of the robotic device 20 such that the robotic device 20 takes a desired posture, the control unit 44 controls the storage unit 28 to store, as posture information, information for defining the posture at that time, such as the joint angles of the drive mechanism 34. At this time, the user may give the robotic device 20 a trigger for making the storage unit 28 store the posture information, using the remote controller, for example. As a result, this posture information reflects the user's preference and sense.

The control unit 44 receives, from the user, the instructions on the plurality of postures to be taken, and controls the storage unit 28 to store the instructions. When the user instructs a large number of postures in the sequence of running actions, the control unit 44 can identify the large number of postures in the sequence of running actions, with the result that the learning efficiency is increased. The control unit 44 receives the plurality of postures in order of being taken and controls the storage unit 28 to store the postures. For example, when the user moves the robotic device 20 such that the robotic device 20 takes the slightly more leaning forward postures of the series of postures illustrated in FIGS. 5(a) to (d) in this order, the control unit 44 controls the storage unit 28 to store posture information for reproducing each posture.

The control unit 44 also functions to perform learning for interpolation of motions between the received plurality of postures while sequentially taking the postures in the learning mode. Thus, the user does not need to give coaching on all the postures, and it is sufficient the user only gives coaching on key postures that the user considers are important for running fast. Note that, in the learning mode, the control unit 44 first controls the drive mechanism 34 such that the robotic device 20 runs while taking the postures designated by the user and postures calculated with a simple algorithm for interpolation between the designated postures. Since the robotic device 20 has not learned enough, the robotic device 20 falls in many cases. The user can check the running robotic device 20 at that time to determine whether more coaching is needed.

Note that, the control unit 44 may have a simulation function of simulating whether or not a mission is accomplishable by reflecting posture instructions received in the coaching mode in the posture of the robotic device 20. This simulation function can determine, by the calculation of, for example, inertia in operation, whether or not a posture is a posture that the robotic device 20 can never take. For example, the simulation function can determine that, in a case where the user moves the robotic device 20 such that the robotic device 20 takes a posture leaning forward too much in the coaching mode, the robotic device 20 certainly falls when the robotic device 20 takes the posture. If the robotic device 20 actually tries the posture and falls, the risk of damage of the robotic device 20 is increased. It is therefore meaningless to try a control mode including a posture with which the robotic device 20 certainly falls. Thus, when predicting an inoperative state with the simulation function, the control unit 44 preferably outputs information associated with the inoperative state to notify the user of the inoperative state. For example, this information may be output from the speaker 36.

Note that, when predicting an inoperative state with the simulation function, the control unit 44 may ignore information associated with a posture that is the cause of the inoperative state. That is, the control unit 44 may ignore a posture with which the robotic device 20 certainly falls, and learn using coached postures other than the posture in question.

In the learning mode, when the user considers that more coaching is needed, the user inputs an instruction to change the mode to the coaching mode. With this, the mode setting unit 42 changes the operation mode to the coaching mode.

As described above, in the coaching mode, the user can input posture instructions by directly changing the posture of the robotic device 20. As another input method, the user may actually run in a model form in front of the robotic device 20, to thereby coach the robotic device 20. At this time, the robotic device 20 may shoot the running user with the camera 24, and the control unit 44 may perform supervised learning by analyzing the image of the user's posture to reflect the posture in its own run. Further, the user may input posture instructions to the robotic device 20 by voice. Instruction input by voice can preferably be performed also in the learning mode. For example, while the robotic device 20 is learning to run fast, the user gives an instruction by voice such as "raise the head" or "lean forward more." The robotic device 20 receives the user's voice by the microphone 22, and the control unit 44 analyzes the content of the speech. The control unit 44 can preferably reflect the speech content in its own motion instantly.

In the manner described above, the user gives coaching on how to run fast, and the robotic device 20 learns, through trial and error, a control mode that enables the robotic device 20 to run fast. In the entertainment system 1, the server device 10 hosts various types of virtual athletic events. One of the athletic events is "5-meter dash," and the user enters a race with his/her own robotic device 20 that has become capable of running fast to try out its abilities.

The user registers his/her own robotic device 20 to the server device 10 in advance to participate in a race with the robotic device 20. The server device 10 registers the robotic device 20 in association with the user, and creates a virtual robot that is a CG model corresponding to the robotic device 20 in advance.

The server device 10 may create the virtual robot, which is a three-dimensional CG model, as a virtual object model having the same appearance as the robotic device 20 in the real world, or as a virtual object model having a different appearance from the robotic device 20 in the real world. In a competition in the entertainment system 1, a plurality of virtual robots each run 5 m in the virtual stadium in synchronization with the actual run of the corresponding robotic device 20. Meanwhile, it is conceivable that the robotic devices 20 that are distributed in the real world all have the same appearance. Thus, when the virtual robot is created as a model having the same appearance as the robotic device 20, the user can possibly not recognize his/her own robot in the virtual stadium. Each user may accordingly customize the appearance of the virtual object. The user can watch, through the terminal device 12, the video of the virtual robot running the 5 m course constructed in the virtual stadium.

Figure 6:
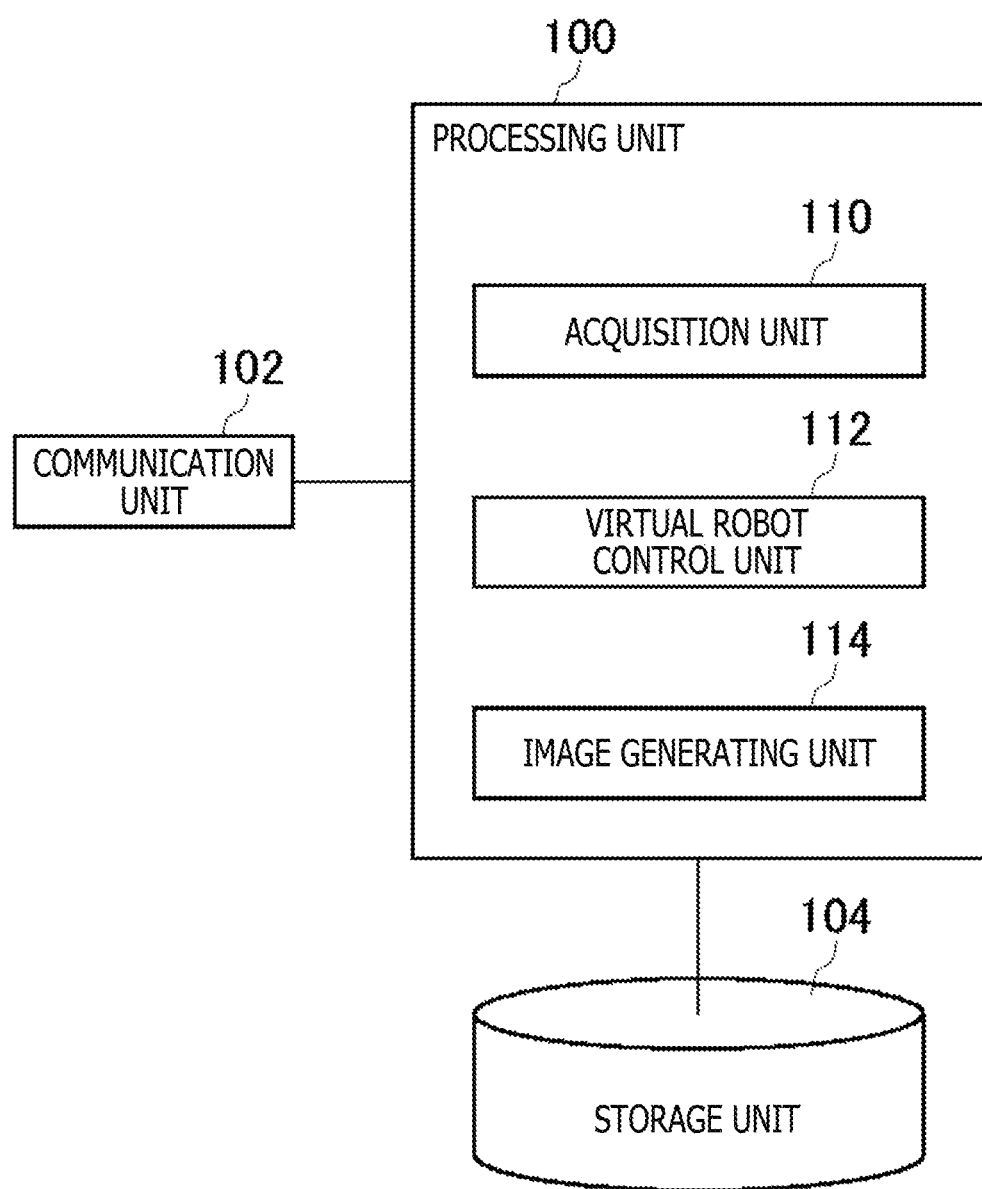
FIG. 6 is a diagram illustrating functional blocks of a server device.

FIG. 6 illustrates functional blocks of the server device 10. The server device 10 includes a processing unit 100, a communication unit 102, and a storage unit 104. The processing unit 100 includes an acquisition unit 110, a virtual robot control unit 112, and an image generating unit 114. The virtual robot control unit 112 makes a plurality of virtual robots compete in the virtual sports venue. In FIG. 6, the elements illustrated as the functional blocks that perform various types of processing can each be configured as a circuit block, a memory, or another LSI in terms of hardware, and can each be configured as a program loaded on a memory in terms of software, for example. It will thus be understood by those skilled in the art that the functional blocks can be configured by hardware only, software only, or a combination thereof in diverse forms and are not limited to any one of such forms.

The storage unit 104 stores information associated with users who join in the entertainment system 1 and their robots. Information associated with users includes address information regarding the robotic devices 20 and the terminal devices 12 of the users, user identification information (user ID (identification)), and personal information such as the names or addresses of the users. Information associated with robots includes shape and appearance data regarding virtual objects associated with the robotic devices 20, and model data necessary for operating and displaying the virtual robots in the virtual space, such as data regarding the positions of the joints of, for example, the arms, the legs, and the necks and the ranges of motion thereof.

Further, the storage unit 104 stores three-dimensional model data regarding virtual space. In the embodiment, since the server device 10 provides the sports venue for 5-meter dash, the storage unit 104 stores at least three-dimensional model data regarding the sports venue for 5-meter dash. Note that, the server device 10 may provide a lobby room in which the user selects and enters a competition. The user may select any one of competitions given as options in the lobby room. The server device 10 may provide, other than 5-meter dash, for example, a sports venue for soccer. The storage unit 104 stores various kinds of three-dimensional model data depending on the competition.

Figure 7:
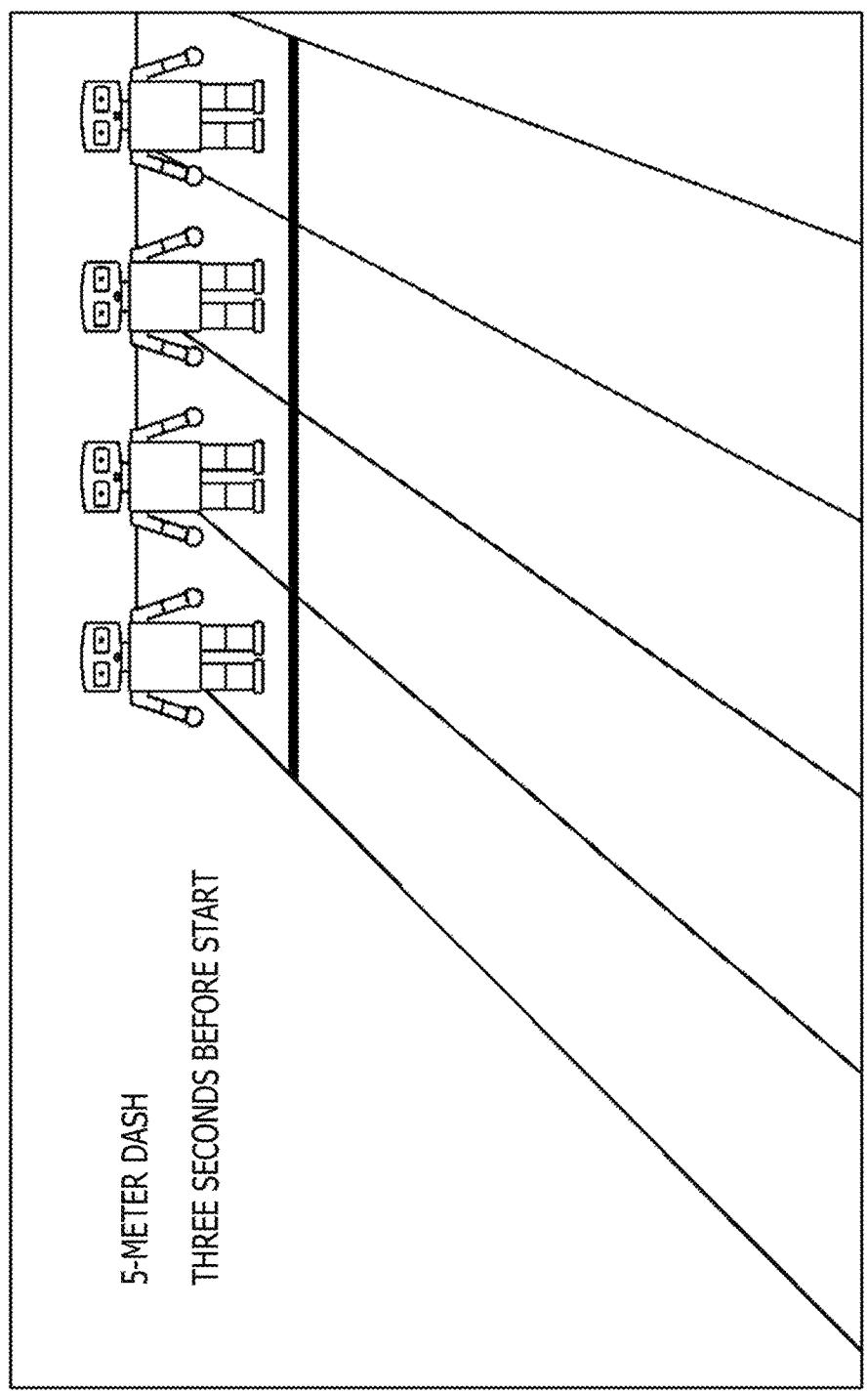
FIG. 7 is a diagram illustrating an example of a sports venue that is displayed on a terminal device.

FIG. 7 illustrates an example of the sports venue that is displayed on the terminal device 12. FIG. 7 illustrates the sports venue in which a competition is to start (before start), and a plurality of virtual robots are lined up on the starting line. Note that, in FIG. 7, all the virtual robots are created to have the same appearance as the real robotic devices 20, and it is thus difficult for the user to recognize his/her own robot. Accordingly, the user may uniquely color the virtual robot for distinction. Further, the user makes changes on the robotic device 20, such as coloring, putting stickers, or changing the shape in some cases. In this case, the server device 10 may receive the taken image of the robotic device 20 to create a virtual robot having a similar appearance to the robotic device 20. Further, above the user's virtual robot, information (for example, arrow) indicating that the virtual robot in question is the user's virtual robot may be displayed. Further, as described above, when the user can create a virtual robot having a different shape from the robotic device 20, the user can easily recognize his/her own robot from the shape difference.

The virtual robot control unit 112 builds the virtual space of the stadium, and lines up the virtual robots of the entered users on the starting line. The image generating unit 114 renders the virtual space in which the virtual robots exist to generate an image that is provided to the user. The communication unit 102 distributes the image to the terminal device 12. The user can request, through the terminal device 12, the server device 10 to provide an image from any viewpoint, for example, an image in the sight direction of his/her own virtual robot or the bird's-eye view image of the virtual robot. When acquiring a viewpoint change request, the image generating unit 114 generates an image having the requested viewpoint, and the communication unit 102 distributes the generated image. The terminal device 12 displays the image distributed in real time on the display. With this, the user can check the virtual robot participating in the competition.

The image of FIG. 7 illustrates the sports venue in which the competition is to start in three seconds. After three seconds elapse from this state, a phrase "on your mark, get set, go" is given by voice, and each user inputs a start instruction to his/her own robotic device 20. Note that, at this time, the operation mode of the robotic device 20 is set to the designated action mode in which the robotic device 20 acts on the basis of instructions from the user. Control may be made such that the robotic device 20 directly receives a phrase "on your mark, get set, go" to start. In any case, in the entertainment system 1, the users in different locations make their own robotic devices 20 run all at once with a signal from the starter. The 5-meter dash race is therefore realized.

The robotic device 20 that has started to run transmits, to the server device 10, operation data for expressing (reproducing) its own real-time motion. The types of operation data for expressing the real-time motion of the robotic device 20 may differ depending on the competition. In a 5-meter dash match, operation data may be detection data by the sensor 26, and it may be sufficient that operation data is data that enables the identification of the running speed or a movement distance from the starting line in a predetermined sampling period. The robotic device 20 transmits the operation data having a timestamp added thereto to the server device 10 in the predetermined sampling period.

The virtual robot control unit 112 uses operation data to control a virtual robot to run in a virtual sports venue. Thus, it is necessary that operation data be data that enables the identification of a cumulative distance that the robotic device 20 has run from the start. Under an ideal communication environment, the robotic device 20 transmits the operation data to the server device 10 in the predetermined sampling period, and the server device 10 controls the motion of the virtual robot such that the virtual robot runs to reach a position away from the starting line by the cumulative distance at a time based on the timestamp added to the operation data. In a case where the robotic device 20 can calculate a cumulative distance from the start by itself, operation data that is periodically transmitted preferably includes the cumulative distance. Note that, in a case where the race mat has added thereto marks indicating movement distances from the starting line and the camera 24 can take the images of the marks, operation data may include the taken image, and the virtual robot control unit 112 may derive, from the taken image, a movement distance from the starting line.

Note that, operation data may include actuator drive data for reproducing the motion of the robotic device 20. The virtual robot control unit 112 may use drive data to control the motion of the robotic device 20 and the motion of the virtual robot to be synchronized with each other.

In the server device 10, the acquisition unit 110 acquires operation data for expressing the real-time motions of the plurality of robotic devices 20 of the plurality of users. The virtual robot control unit 112 uses the operation data regarding the plurality of robotic devices 20 to move the plurality of virtual robots corresponding to the plurality of robotic devices 20 in the same virtual space. To reflect the operation data in the motions of the virtual robots, the virtual robot control unit 112 controls a virtual robot corresponding to the robotic device 20 capable of running fast in the real world to run fast in the virtual world. That is, the actual speed of the robotic device 20 is reflected in the speed of the virtual robot. With this, the 5-meter dash race in which the plurality of robotic devices 20 present in different locations participate is established.

The image generating unit 114 generates the image of the virtual space in which the plurality of virtual robots are in motion, and the communication unit 102 transmits the image to the terminal device 12 of the user. The user can watch his/her own virtual robot competing against the virtual robots of the other users and feel as if the user saw his/her child in a sports day.

The structure in which the server device 10 generates a VR (virtual reality) video and distributes the video to each terminal device 12 is described above. In the above-mentioned example, the plurality of virtual robots in motion are expressed in the virtual space with the use of the operation data for expressing the real-time motions of the corresponding robotic devices 20. The virtual robots other than the user's virtual robot may, however, move with past operation data.

Now, there is described a structure in which the server device 10 distributes operation data regarding the robotic devices 20 of other users to the terminal device 12 of the user, and the terminal device 12 generates an AR (augmented reality) video.

Figure 8:
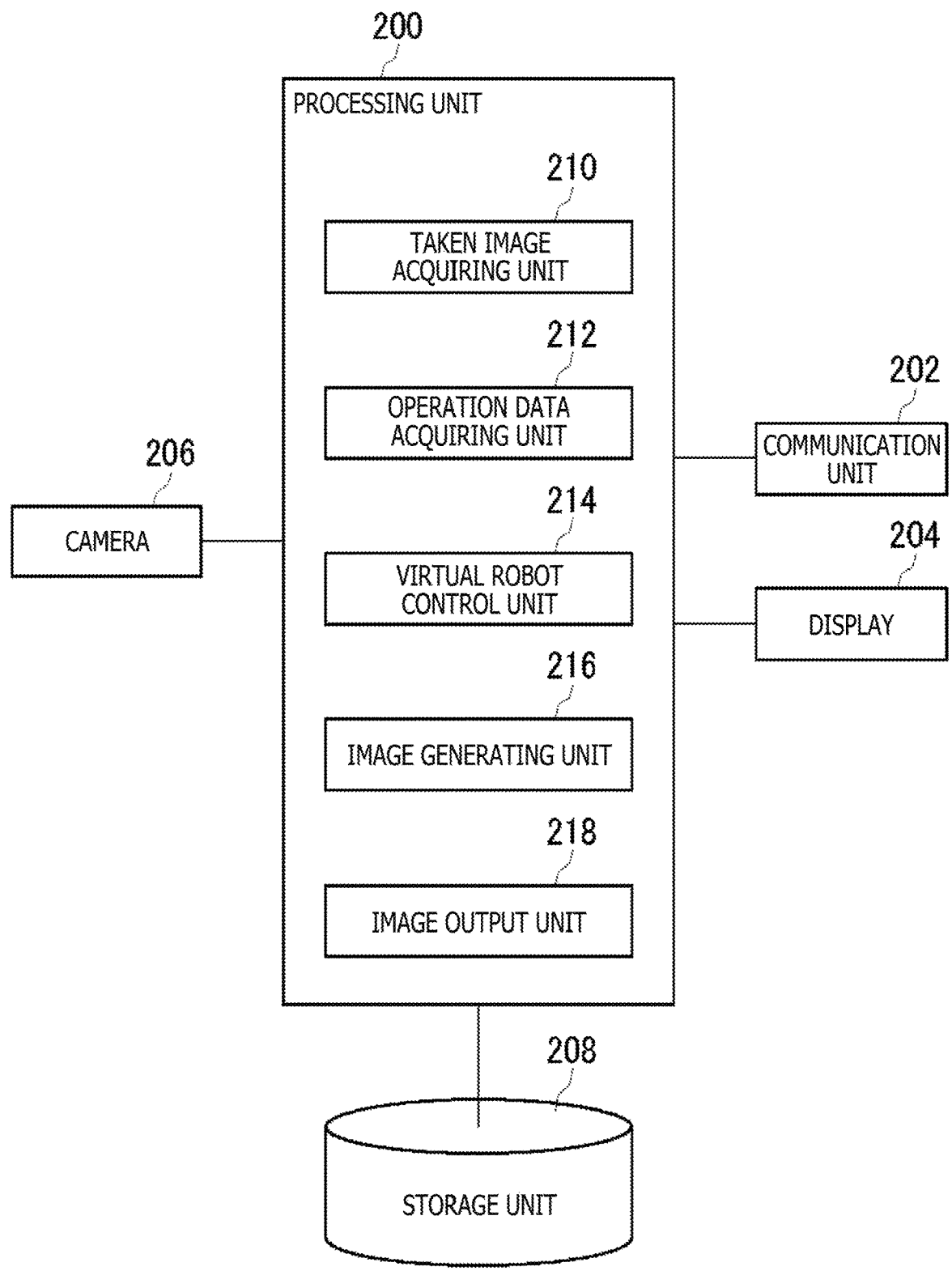
FIG. 8 is a diagram illustrating functional blocks of the terminal device.

FIG. 8 illustrates functional blocks of the terminal device 12. The terminal device 12 includes a processing unit 200, a communication unit 202, a display 204, a camera 206, and a storage unit 208. The processing unit 200 includes a taken image acquiring unit 210, an operation data acquiring unit 212, a virtual robot control unit 214, an image generating unit 216, and an image output unit 218. In FIG. 8, the elements illustrated as the functional blocks that perform various types of processing can each be configured as a circuit block, a memory, or another LSI in terms of hardware, and can each be configured as a program loaded on a memory in terms of software, for example. It will thus be understood by those skilled in the art that the functional blocks can be configured by hardware only, software only, or a combination thereof in diverse forms and are not limited to any one of such forms.

The terminal device 12 displays, on the display 204, the plurality of robotic devices 20 in motion. In this example, under a state where a live view is being displayed on the display 204, the user shoots the running robotic device 20 with the camera 206 to generate an AR video in which the virtual robots of the other robotic devices 20 are running along the robotic device 20.

The storage unit 208 stores information associated with other users also participating in a competition. When the user enters the athletic event of 5-meter dash, the server device 10 identifies the robotic devices 20 of other users that are to run together, and provides information associated with the other users to the terminal device 12. Information associated with other users includes at least shape and appearance data regarding virtual objects associated with the robotic devices 20 of the other users, and model data necessary for operating and displaying the virtual robots in the virtual space, such as data regarding the positions of the joints of, for example, the arms, the legs, and the necks and the ranges of motion thereof.

The camera 206 shoots the moving (running) robotic device 20. The taken image acquiring unit 210 acquires the image being shot by the camera 206. The operation data acquiring unit 212 acquires operation data for expressing the motions of the robotic devices 20 of the other users. The virtual robot control unit 214 identifies the 5-meter dash course included in the taken image. In the case where a race mat is laid on the floor as described above, the virtual robot control unit 214 extracts, from the image, the starting line and finishing line drawn on the race mat to identify the 5-meter dash course.

Before the start, the user places the robotic device 20 on the starting line on the race mat, and the virtual robot control unit 214 places the virtual robots side by side with the robotic device 20. The image of this state is generated by the image generating unit 216 to be displayed on the display 204. Upon a start signal, the user operates the start switch of the robotic device 20 to make the robotic device 20 start to run. The virtual robot control unit 214 makes, from the operation data regarding the robotic devices 20 of the other users, the virtual robots of the other users run along the 5-meter dash course. The image generating unit 216 generates an image in which the virtual robots of the other users are superimposed on a live view image obtained by shooting the robotic device 20. The image output unit 218 outputs the image obtained as a result of superimposition to the display 204. With this, the user can watch the competition between his/her own robotic device 20 and the virtual robots of the other users on the race mat in the house.

As described with regard to the VR video generation processing, the operation data acquiring unit 212 acquires operation data for expressing the real-time motions of the robotic devices 20 of other users, which are in different locations from the robotic device 20 of the user. Note that, operation data regarding other users may be acquired through the server device 10 or directly acquired from the robotic devices 20 of the other users. With this, the user can watch a 5-meter dash match in real time. With an AR video, the user's house is a venue for 5-meter dash, and hence the user can relax and watch the performance of the robotic device 20.

Note that, the operation data acquiring unit 212 may read out and acquire, from the storage unit 208, second operation data for expressing the past motions of the robotic devices 20 of other users. For example, the terminal device 12 acquires, from the server device 10, operation data regarding a 5-meter dash world champion in advance, and controls the storage unit 28 to store the operation data. With this, the user can enjoy a match with the world champion whenever he/she wants.

The competition not using sporting goods is described above. When the function of the robotic device 20 is enhanced, the robotic device 20 can play ball games using balls, for example. Now, there is described an example in which the person in charge of the entertainment system 1 rents a gymnasium to host a soccer game with the robotic devices 20. Here, in the gymnasium, a soccer field is formed by a marker such as a tape. In a 5-meter dash game, it is sufficient that the robotic device 20 runs 5 m independent of the other robotic devices 20. In a game such as a ball game, however, relationships with others are important, and hence it is necessary that the robotic device 20 can recognize its own position, the positions of the other robotic devices 20, and the position of the ball in the stadium in real time. As such position recognition technology, an image recognition technology using a camera such as SLAM (simultaneous localization and mapping) may be used. In the embodiment, as the position recognition and object recognition technologies, existing ones are used.

Figure 9:
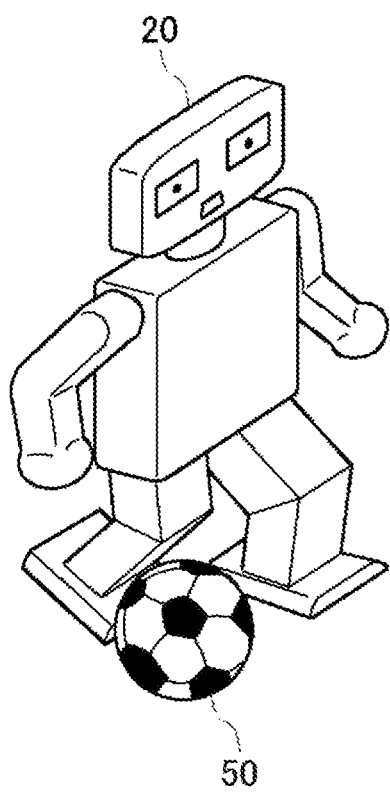
FIG. 9 is a diagram illustrating the robotic devices playing soccer.
Figure 9:
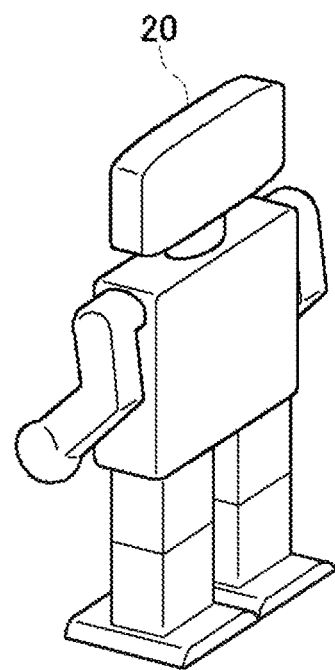

FIG. 9 illustrates the robotic devices 20 playing soccer. Soccer is a ball game in which the two teams each try to get the ball into the other team's goal without using the hands and compete for the scores. If a soccer game with the robotic devices 20 is hosted in reality, the ball does not roll well due to the weak kick power, resulting in a boring game. Accordingly, in the embodiment, as a ball, a moving body 50 having a self-propulsion assist function is employed such that the moving body 50 kicked by the robotic device 20 rolls with great force, and the game is thus made more attractive. Further, in contrast, in a small soccer field, the ball rolls too much and easily leaves the field in some cases. Also in this case, since the moving body 50 has the self-propulsion assist function, the moving body 50 can perform control to reduce its own roll, for example. Note that, in the example illustrated in FIG. 9, the moving body 50 configured as a spherical robot may be formed with the use of the technology described in PTL 2, for example. Note that, the moving body 50 is not necessarily spherical, and may take any shape as long as having the self-propulsion assist function. For example, the moving body 50 may have a flying function to express the floating ball.

Figure 10:
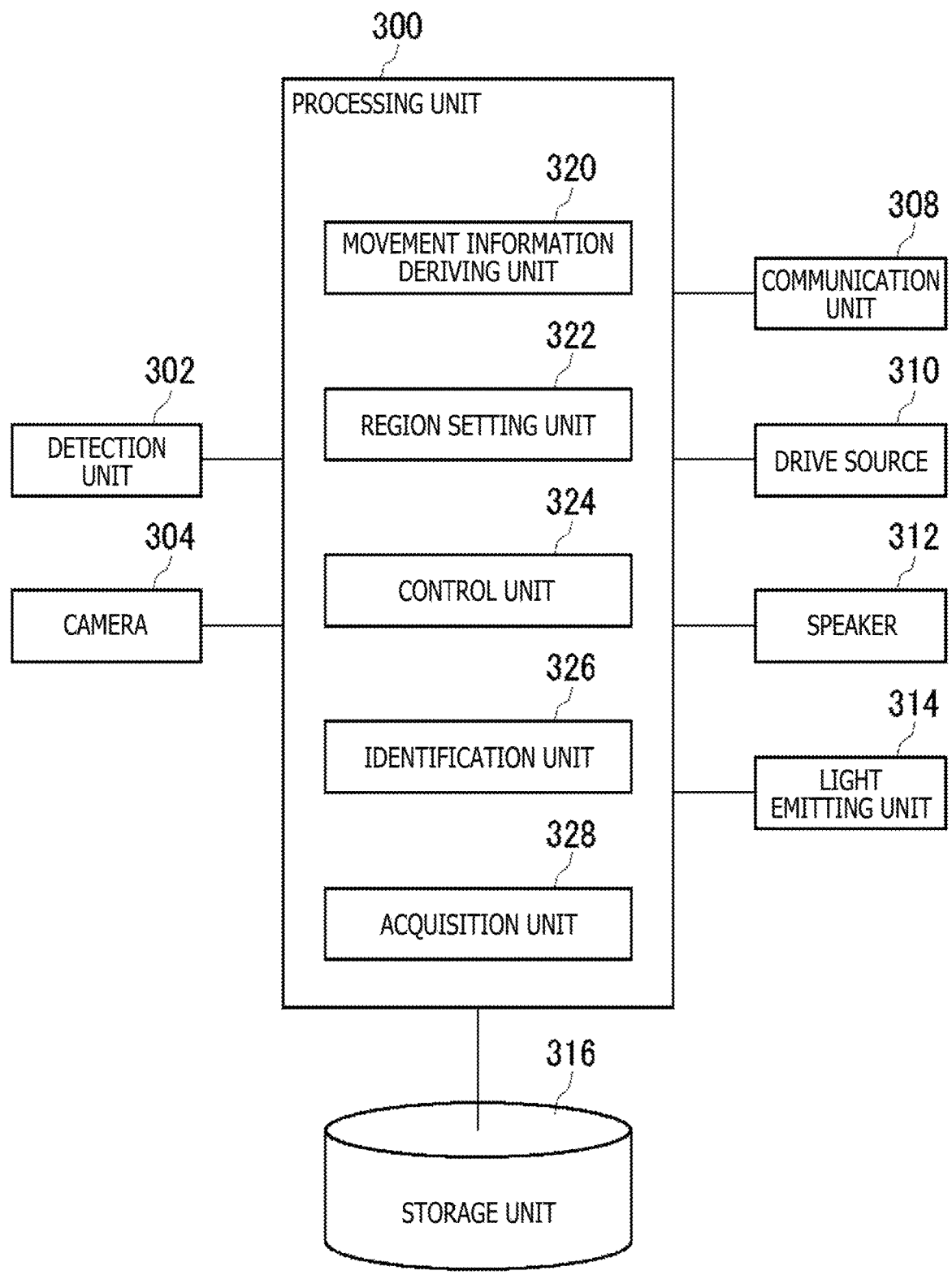
FIG. 10 is a diagram illustrating functional blocks of a moving body.

FIG. 10 illustrates functional blocks of the moving body 50. The moving body 50 includes a processing unit 300, a detection unit 302, a camera 304, a communication unit 308, a drive source 310, a speaker 312, a light emitting unit 314, and a storage unit 316. The processing unit 300 includes a movement information deriving unit 320, a region setting unit 322, a control unit 324, an identification unit 326, and an acquisition unit 328. In FIG. 10, the elements illustrated as the functional blocks that perform various types of processing can each be configured as a circuit block, a memory, or another LSI in terms of hardware, and can each be configured as a program loaded on a memory in terms of software, for example. It will thus be understood by those skilled in the art that the functional blocks can be configured by hardware only, software only, or a combination thereof in diverse forms and are not limited to any one of such forms.

The detection unit 302 detects external force applied to the moving body 50. For example, the detection unit 302 may be a force sensor. The detection unit 302 is provided near the external surface of the moving body 50 and detects the magnitude and direction of external force applied to the moving body 50. The detection unit 302 according to the embodiment detects the magnitude and direction of external force that the robotic device 20 has applied to the moving body 50, that is, the kick power.

The movement information deriving unit 320 derives the movement direction and movement speed of the moving body 50 on the basis of external force detected by the detection unit 302. As a movement direction, the same direction as a direction in which the moving body 50 has been kicked may be derived.

Here, the movement information deriving unit 320 may calculate the movement speed by multiplying the detected magnitude of the external force and a predetermined gain together. This gain is preferably defined depending on the robotic device 20. For example, when the robotic devices 20 participating in a soccer game are all robots having the same specification, the same gain may be used. In a case where the robotic devices 20 having different specifications are mixed, however, there may be robots having strong kick power and robots having weak kick power. Thus, with gains adjusted depending on the robot specifications in advance, the movement information deriving unit 320 may derive the movement speed using the gain for the robotic device 20 that has applied external force to the moving body 50. In the embodiment, small gains may be used for the robotic devices 20 having strong kick power, while large gains may be used for the robotic devices 20 having weak kick power such that an effect due to a difference in kick power on the fun of the game may be reduced. Further, the gain for each robotic device 20 may not be constant, and may be defined depending on the magnitude of detected external force. For example, when a larger external force has been detected, a larger gain may be set.

Thus, the moving body 50 acquires in advance the identification information (robot ID) of the robotic devices 20 which are to participate in the soccer game before the match starts. The identification unit 326 identifies the robotic device 20 which has kicked the moving body 50, and the movement information deriving unit 320 calculates the movement speed of the moving body 50 using the gain for the identified robotic device 20. The identification unit 326 may analyze an image taken by the camera 304, for example, to thereby identify an object that has kicked the moving body 50, specifically, the robotic device 20. Further, the communication unit 308 may acquire the robot ID from the robotic device 20 that has kicked the moving body 50, and send the robot ID to the identification unit 326 such that the identification unit 326 may identify the robotic device 20 that has kicked the moving body 50. In this way, the identification unit 326 identifies the robotic device 20, so that the movement information deriving unit 320 can derive the movement direction and movement speed of the moving body 50 depending on the robotic device 20.

The control unit 324 drives the drive source 310 to move the moving body 50. The drive source 310 includes, for example, a plurality of motors. When the moving body 50 is kicked by the robotic device 20 and the movement information deriving unit 320 derives the movement direction and movement speed of the kicked moving body 50, the control unit 324 drives the drive source 310 on the basis of the derived movement direction and movement speed, to thereby move the moving body 50. Since the control unit 324 controls the movement of the moving body 50 in this way, even when the kick power of the robotic device 20 is weak, the moving body 50 moves in the field with the self-propulsion assist function and the soccer game is therefore established.

Note that, in an actual soccer game, the kicked ball loses momentum and finally stops. Thus, after the control unit 324 has moved the moving body 50 at the movement speed derived on the basis of the external force, the movement information deriving unit 320 calculates the movement speed of the moving body 50 as gradually decreasing as time lapses. With this, the moving body 50 kicked by the robotic device 20 does not roll forever and stops. At this time, the movement information deriving unit 320 may gradually decrease the movement speed of the moving body 50 in consideration of the effect of virtual friction on the ground surface.

In accordance with the soccer rules, when the ball crosses the touch line, the ball is returned to the field by a throw-in, and when the ball crosses the goal line, the game restarts with a goal kick or a corner kick. Such strict rules are not necessarily applied to robot soccer. Control may be made such that when the ball is to cross the line, the ball may bounce off a virtually provided wall to return toward the field.

To realize this control, the region setting unit 322 sets a region in real space in which the moving body 50 is movable. Here, the real space region is within a field surrounded by the touch lines and the goal lines. In a case where the region setting unit 322 sets a region inside the field as a region in which the moving body 50 is movable, the identification unit 326 analyzes an image taken by the camera 304, for example, to identify that the moving body 50 reaches the boundary when the moving body 50 is to go out of the field. The identification unit 326 notifies the movement information deriving unit 320 of the identification result. Since the moving body 50 does not cross the lines and returns to the field in accordance with the rules in this case, the movement information deriving unit 320 changes at least the movement direction at the field boundary and notifies the control unit 324 of the change. With this, the control unit 324 controls the moving body 50 to move as if the moving body 50 bounced off the invisible wall on the line, and play continues.

In this example, the users who participate in the soccer game bring the robotic devices 20 to the actual venue. As described above, however, the users may participate in a game hosted in a virtual soccer venue. At this time, users who participate in a soccer game each need to own the robotic device 20 and the moving body 50. The server device 10 acquires operation data from each robotic device 20 and each moving body 50, and manages the positions of the robotic devices 20 and the moving body 50 in the field.

Note that, the server device 10 acquires data regarding external force applied to the moving body 50 of each user. The server device 10 transmits the acquired external force data to the moving bodies 50 of users other than a user whose moving body 50 has actually received the external force. In the moving body 50, the communication unit 308 receives, from the server device 10, the data regarding the virtual external force applied to the moving body 50. When the acquisition unit 328 acquires the external force data, the movement information deriving unit 320 derives the movement direction and movement speed of the moving body 50 on the basis of the acquired virtual external force. With this, the moving body 50 in the user's house moves when the robotic device 20 of another user who is playing the game in a remote location kicks the moving body 50.

Note that, in the case where a game is held in a virtual soccer venue, each user secures the space of a soccer field in the house. The secured space is set as a moving-body movable region in real space by the region setting unit 322. In this case, it is assumed that the users are different from each other in securable space, and hence the movement information deriving unit 320 of each moving body 50 preferably uses a gain adjusted depending on how large a set region is to derivate the movement speed. The control unit 324 may control, along with the operation of the moving body 50, sound that is output from the speaker 312 or light emission by the light emitting unit 314.

The server device 10 manages the positions of the robotic devices 20 and the moving body 50 in the virtual field in real time, and moves the virtual robot of each robotic device 20 in the virtual field. For example, in a case where the virtual robots collide, the server device 10 transmits, to the corresponding robotic devices 20, virtual external force that the virtual robots receive due to the collision. In the robotic device 20, when the reception unit 40 receives the virtual external force, the control unit 44 drives the drive mechanism 34 to reproduce a state with the external force, to thereby move the robotic device 20.

The server device 10 determines collisions in this example, but the robotic device 20 may determine collisions. At this time, the reception unit 40 may receive, from the server device 10, information regarding the positions of the other virtual robots in the virtual field, and the control unit 44 may determine a collision on the basis of its own position in the virtual field. When determining that a collision with another virtual robot occurs in the virtual field, the control unit 44 derives virtual external force received due to the collision, and drives the drive mechanism 34 to reproduce a state with the external force, to thereby move the robotic device 20.

The present invention has been described above on the basis of the embodiment. The embodiment is only illustrative, and it will be understood by those skilled in the art that various modifications can be made to the components and the processing processes according to the embodiment, and that such modifications are also within the scope of the present invention. In the embodiment, as means for seeing the robotic device 20, the terminal device 12, which is a smartphone, for example, is described. However, the user may see the robotic device 20 using a head mounted display or the like.

REFERENCE SIGNS LIST

1 . . . Entertainment system, 10 . . . Server device, 12 . . . Terminal device, 20 . . . Robotic device, 22 . . . Microphone, 24 . . . Camera, 26 . . . Sensor, 28 . . . Storage unit, 30 . . . Processing unit, 32 . . . Communication unit, 34 . . . Drive mechanism, 36 . . . Speaker, 38 . . . Light emitting unit, 40 . . . Reception unit, 42 . . . Mode setting unit, 44 . . . Control unit, 50 . . . Moving body, 100 . . . Processing unit, 102 . . . Communication unit, 104 . . . Storage unit, 110 . . . Acquisition unit, 112 . . . Virtual robot control unit, 114 . . . Image generating unit, 200 . . . Processing unit, 202 . . . Communication unit, 204 . . . Display, 206 . . . Camera, 208 . . . Storage unit, 210 . . . Taken image acquiring unit, 212 . . . Operation data acquiring unit, 214 . . . Virtual robot control unit, 216 . . . Image generating unit, 218 . . . Image output unit, 300 . . . Processing unit, 302 . . . Detection unit, 304 . . . Camera, 308 . . . Communication unit, 310 . . . Drive source, 312 . . . Speaker, 314 . . . Light emitting unit, 316 . . . Storage unit, 320 . . . Movement information deriving unit, 322 . . . Region setting unit, 324 . . . Control unit, 326 . . . Identification unit, 328 . . . Acquisition unit.

INDUSTRIAL APPLICABILITY

The present invention can be used in robotic systems.

The invention claimed is:

1. A moving body comprising:
a control unit configured to drive a drive source, thereby moving the moving body in response to a self-propulsion assist function within the moving body;
a detection unit configured to detect an external force directly applied by an external device to the moving body; and
a movement information deriving unit configured to derive, based on the detected external force, a movement direction and movement speed of the moving body,
wherein the control unit drives the drive source based on the movement direction and movement speed.

2. The moving body according to claim 1, further comprising:
an acquisition unit configured to acquire virtual external force applied to the moving body,
wherein the movement information deriving unit derives, based on the acquired virtual external force, the movement direction and movement speed of the moving body.

3. The moving body according to claim 1, further comprising:
an identification unit configured to identify an object that has applied the external force,
wherein the movement information deriving unit derives, based on the object identified by the identification unit, the movement direction and movement speed of the moving body.

4. The moving body according to claim 1, further comprising:
a region setting unit configured to set a region in real space in which the moving body is movable,
wherein the movement information deriving unit changes at least the movement direction at a boundary of the region.

5. The moving body according to claim 4, wherein the movement information deriving unit derives the movement speed depending on the set region.

6. The moving body according to claim 1, wherein after the control unit has moved the moving body at the movement speed derived based on the external force, the movement information deriving unit gradually decreases the movement speed of the moving body.

7. The moving body according to claim 6, wherein the movement information deriving unit gradually decreases the movement speed of the moving body in consideration of an effect of virtual friction on a ground surface.

8. A control method for a moving body, comprising:
driving a drive source, thereby moving the moving body in response to a self-propulsion assist function within the moving body;
detecting an external force directly applied by an external device to the moving body; and
deriving, based on the detected external force, a movement direction and movement speed of the moving body; and
wherein the driving includes driving the drive source based on the movement direction and movement speed.

9. A non-transitory, computer readable storage medium containing a program for causing a computer mounted on a moving body to carry out actions, comprising:
driving a drive source, thereby moving the moving body in response to a self-propulsion assist function within the moving body;
detecting an external force directly applied by an external device to the moving body; and
deriving, based on the detected external force, a movement direction and movement speed of the moving body; and
wherein the driving includes driving the drive source based on the movement direction and movement speed.

* * * * *